March 3, 1953  R. M. CARRIER, JR  2,630,209
HELICAL VIBRATORY CONVEYER
Filed April 26, 1946  5 Sheets-Sheet 1

Inventor
ROBERT M. CARRIER, JR.
By The Firm of Charlesworthills Attys.

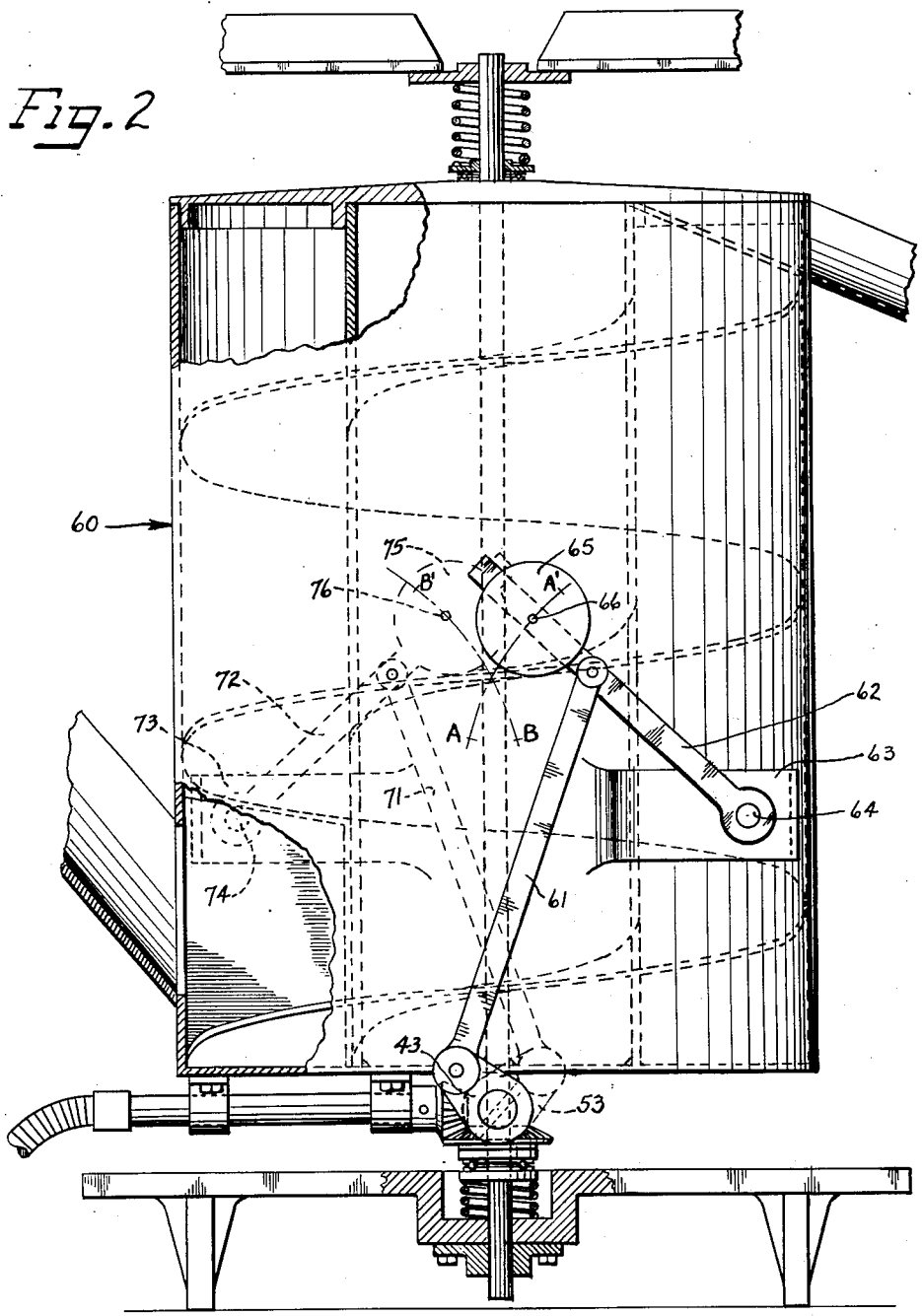

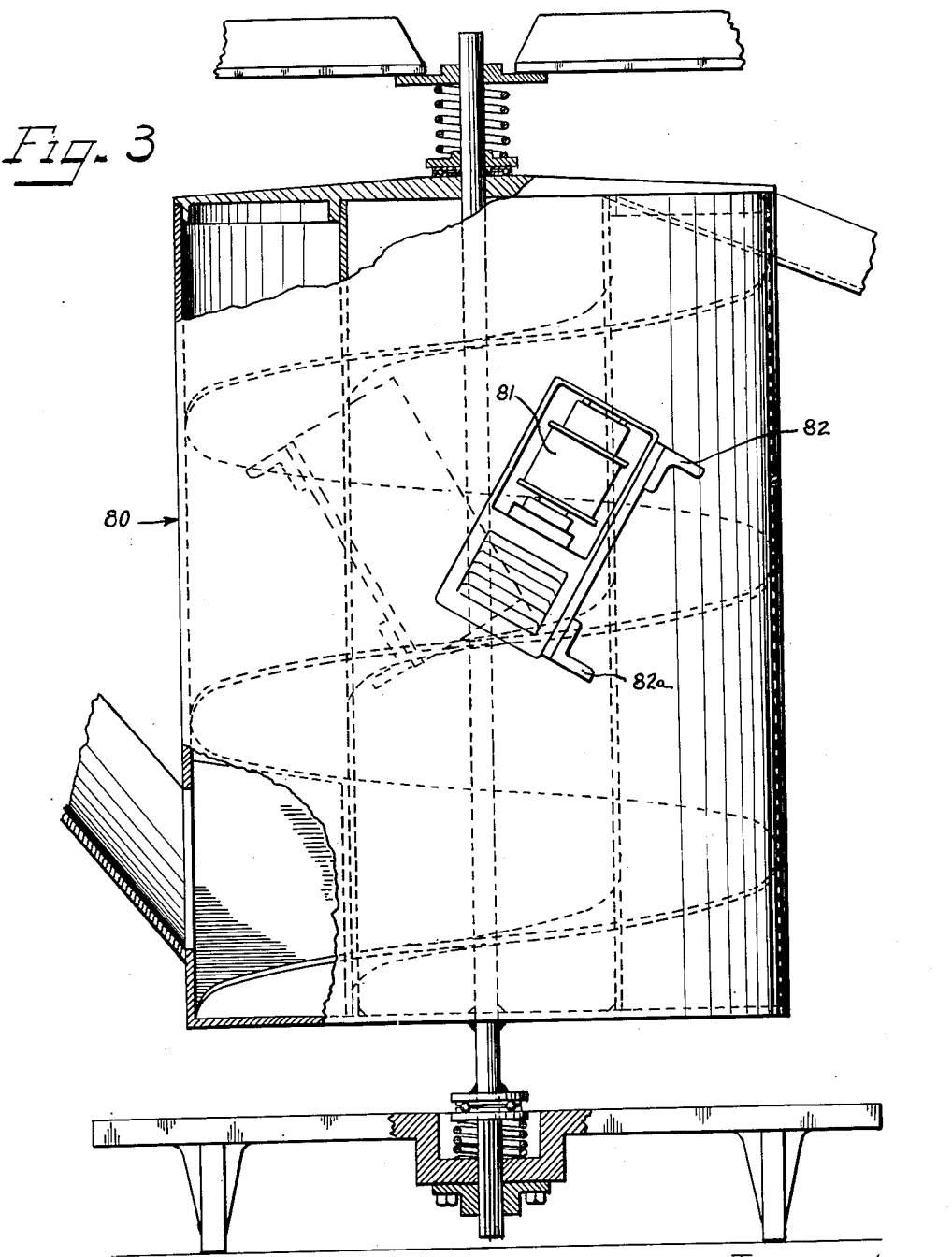

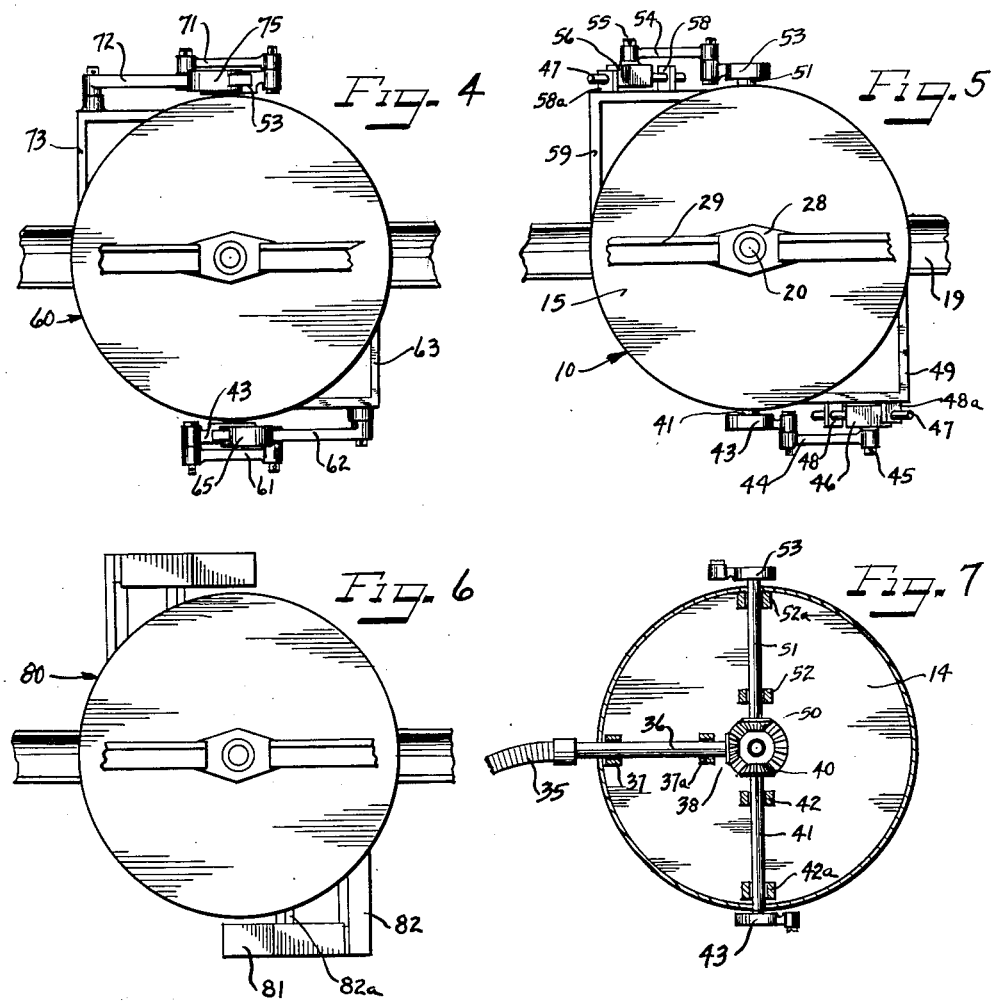

March 3, 1953  R. M. CARRIER, JR  2,630,209
HELICAL VIBRATORY CONVEYER

Filed April 26, 1946  5 Sheets—Sheet 5

Inventor
ROBERT M. CARRIER, JR.

Patented Mar. 3, 1953

2,630,209

UNITED STATES PATENT OFFICE 2,630,209

HELICAL VIBRATORY CONVEYER

Robert M. Carrier, Jr., Aurora, Ill., assignor, by mesne assignments, to Carrier Conveyor Corporation, Louisville, Ky., a corporation of Kentucky Application April 26, 1946, Serial No. 665,059

17 Claims. (Cl. 198—220)

This invention relates to improvements in methods of and apparatus for conveying material upwardly. More particularly this invention relates to conveyors of the type used to convey discrete material or the equivalent from one point to another on different planes of elevation. While the method and apparatus of this invention is especially adapted to be used in moving material from one level to another and will hereinafter be specifically described for such usage, many other usages of the invention, such as for screening, drying or otherwise processing material, will be apparent to one skilled in the art.

In a preferred embodiment of my invention I have provided a conveyor having an inclined conveyor surface which progresses upwardly in a counter-clockwise direction about a center axis at a constant or fixed angle, the inside angle being greater than the outside but both respectively being constant. For convenience, the average between the two may be called the angle of climb. By means of a simple mechanism the entire conveyor surface is periodically given a simultaneous counter-clockwise movement about its axis and an upward movement along the axis. The path so described by any point on the conveyor surface is a path curved about the axis and extending upwardly at an angle to the already upwardly inclined conveyor surface. This angle may be from 5° to 70° depending upon the positioning of the actuating mechanism. After a definite travel along this upwardly curved path, the movement of the conveyor surface is stopped and then moved downwardly in a clockwise direction about the axis. A particle of material resting on the conveyor surface will thus be moved upwardly forward by the upward counter-clockwise travel of the conveyor surface. When the particle of material comes to rest it will be on an advanced part of the conveyor surface since, not only has it been thrown forward, but the conveyor surface has moved in a reverse direction in its return stroke. By applying this method of advancing material along a surface by a series of directionally controlled throws to a conveyor having its conveying surface inclined at an angle somewhat less than the angle of repose of the material, I have provided a new and efficient means of moving material upwardly to a higher level on a spiral, helix or upwardly curved flight.

With the foregoing in mind, it is an important object of this invention to provide a method of and apparatus for moving material upwardly embodying a conveyor surface which by virtue of its bodily movement in a curvilinear reciprocating path causes material to be propelled forwardly and upwardly along its surface in a series of directionally controlled throws.

Another object of this invention is to provide a conveyor having an inclined conveyor surface which pivots about a vertical shaft and has combined vertical reciprocation and angular oscillation about the center shaft resulting in a curvilinear reciprocation of every point on the conveyor surface at a definite angle to the plane of the conveyor surface whereby material is moved up the inclined conveyor surface.

A further object of this invention is to provide a conveyor which, by virtue of the cyclical reciprocating movement of the conveyor in a path curved about a center axis which appears as a straight line or substantially a straight line when viewed from the side of the conveyor, material will move upwardly along an inclined rotarily curvate path.

Another and still further object of this invention is to provide a conveyor which employs as a driving means a simple mechanism which is easy to install and maintain and is dependable in operation.

It is also an object of this invention to provide a conveyor which employs a simple, efficient electrical device as a means of imparting a reciprocating movement to the conveyor.

One of the important features of this invention is the provision of a conveyor having a spiral conveyor surface inclined at an angle to the horizontal and a slider-crank mechanism mounted in fixed relation to the conveyor for the purpose of imparting a reciprocating movement to the conveyor at a definite angle to the plane of the conveyor surface.

Another feature of this invention is the provision of a conveyor which employs an electrical vibrating device to obtain a reciprocating movement of the conveyor.

A further feature of this invention is the provision of a conveyor having a mechanical device for imparting curvilinear reciprocating movement to the conveyor which consists of weighted arms oscillating in an arcuate path in fixed relation to the conveyor surface.

The novel features which I believe to be characteristic of my invention are set forth in the appended claims. My invention, however, both as to its manner of construction and method of operation, together with further objects and advantages thereof, may best be understood by reference to the following description, taken in connection with the accompanying drawings, in which:

Figure 2 is a fragmentary side elevational view, partly in section and partly broken away, of a modified form of my invention;

Figure 3 is a fragmentary side elevational view, partly in section and partly broken away of a second modification of my invention;

Figure 4 is a fragmentary plan view of the apparatus of Figure 2;

Figure 5 is a fragmentary plan view of the apparatus of Figure 1;

Figure 6 is a fragmentary plan view of the apparatus of Figure 3;

Figure 7 is a fragmentary sectional plan view of the apparatus of Figure 1 taken substantially along line VII—VII of Figure 1 looking in the direction indicated by the arrows.

As shown on the drawings:

Figure 1:
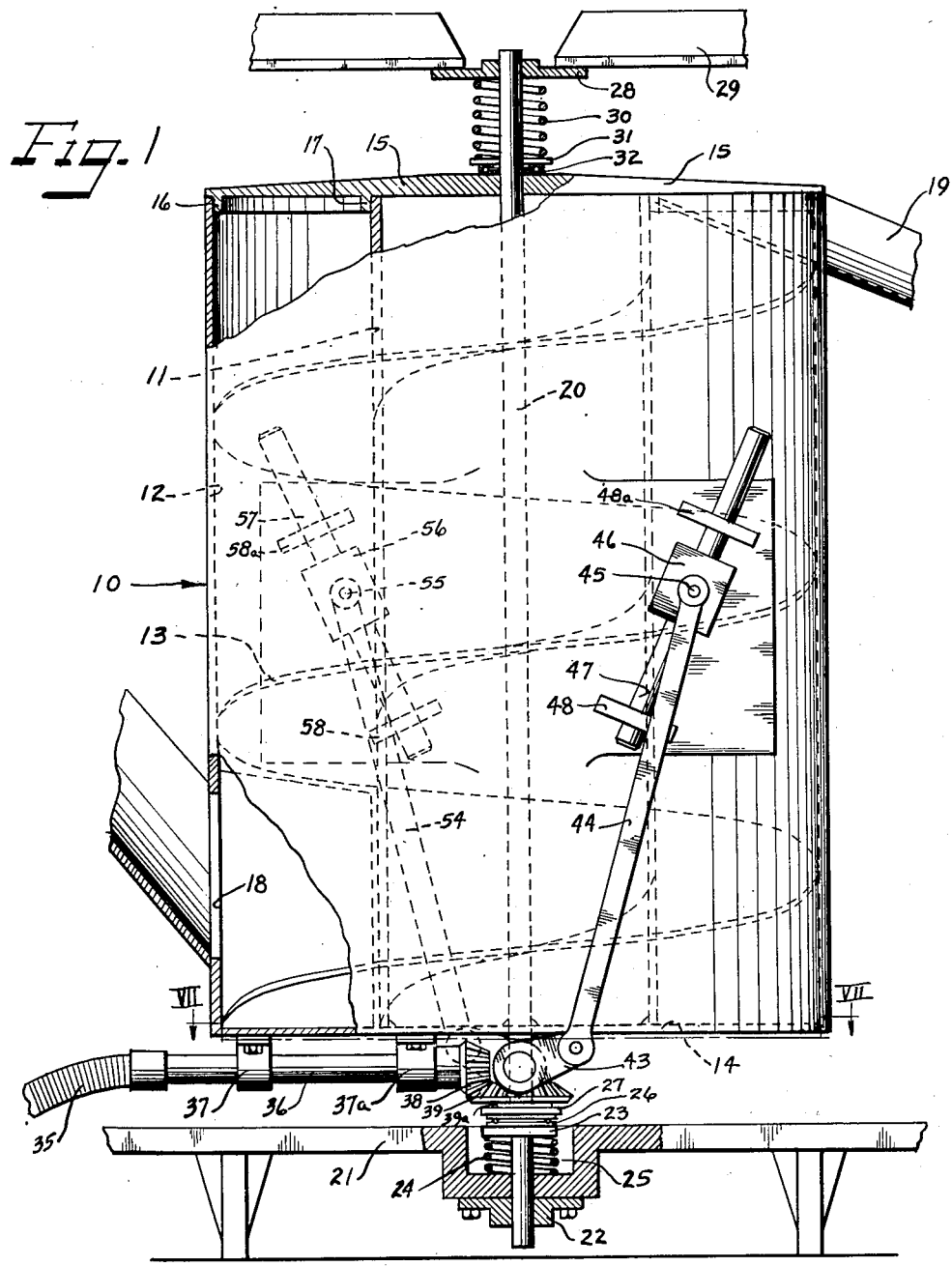
Figure 1 is a fragmentary side elevational view, partly broken away and partly in section, of one embodiment of my invention.

In the preferred embodiment of my invention as illustrated in Figures 1, 5 and 7 the conveyor assembly 10 comprises an inner cylindrical wall 11 and an outer cylindrical wall 12 spaced from the inner wall and concentric therewith. Between the walls 11 and 12 and permanently fastened thereto, as by welding, is disposed a helical element 13, the upper surface of which provides a helical conveying surface. This helical conveying surface has an average angle of inclination which as illustrated may be approximately 12° with respect to the horizontal.

The conveyor preferably has a bottom plate 14 which, as shown, may be integral with the outer cylindrical wall 12. The inner wall 11 is welded to the bottom plate 14 for rigidity. A cover plate 15 is positioned on top of the conveyor by means of downwardly projecting rings 16 and 17. The cover plate 15 is welded to the outer wall 12. Material to be conveyed may be introduced upon the conveyor surface through an opening 18 in the lower portion of the outer wall 12, and the material may be discharged from the upper end of the conveyor surface by means of a suitable chute 19 extending through the upper part of the wall 12.

A vertical center shaft 20 is provided as a pivoting means for the conveyor. This shaft 20 is welded to the bottom plate 14 and the cover plate 15 of the conveyor. At its lower end this shaft passes through an opening in a conveyor support 21 and is journaled in a bushing 22 which is mounted on support 21. A thrust plate 23 is loosely disposed about shaft 20 and rests on a properly selected coil spring 24 which is positioned in a cylindrical recess 25 about shaft 20. Such a spring may, for example, have a natural frequency of one-tenth of the operation reciprocation. So that if the conveyor is being operated at a reciprocation rate of 1000 per minute the natural spring frequency would be approximately 100 per minute. A thrust bearing 26 is located between the thrust plate 23 and a shoulder 27 of shaft 20. It is apparent therefore that the entire weight of the conveyor 10 is transmitted by the shoulder 27 through the thrust bearing 26 and the thrust plate 23 to the spring 24.

At its upper end the shaft 20 is journaled in a bushing 28 which is secured, as by welding, to a supporting frame structure 29. A properly selected coil spring 30 as aforesaid is positioned around shaft 20 between bushing 28 and a thrust plate 31 which is loosely disposed around shaft 20. A thrust bearing 32 is located between the thrust plate 31 and the top cover plate 15 of the conveyor 10.

Thus it may be seen that the conveyor is mounted for rotation with its shaft 20 in bushings 22 and 28 and is free to move in a vertical direction being guided in such movement by the same bushings 22 and 28. When the conveyor moves upwardly the spring 24 expands to take up any possible clearance between the shoulder 27 of shaft 20 and the thrust bearing 26.

As best shown in Figure 7, the means provided in my invention for imparting movement to the conveyor 10 comprises a flexible drive shaft 35 which is connected at one end to a driving means, not illustrated, and at the other end to a rotatable shaft 36. The shaft 36 is supported by two journal bearings 37 and 37a which are suspended from the under side of bottom plate 14 (Fig. 1). A bevel gear 38 which is in mesh with a bevel gear 39 is mounted at the end of shaft 36 for rotation therewith. The bevel gear 39 is loosely disposed about shaft 20 and is supported by shoulder 27 of shaft 20. A bushing 39a provides a bearing surface on which gear 39 may rotate in relation to shoulder 27 (Figure 1).

A bevel gear 40, which is mounted for rotation with shaft 41, is also in mesh with gear 39. The shaft 41 is supported by two journal bearings 42 and 42a which are suspended from the under side of bottom plate 14. At the outer end of shaft 41 a crank 43 is secured for rotation therewith. This crank 43 drives a connecting rod 44 (Fig. 1) which is pivotally fastened by means of a pin 45 to a weight 46. As best shown in Figure 5 the weight 46 is rigidly secured to a rod 47 passing through its center. The rod 47 is positioned for slidable movement in a pair of journal bearings 48 and 48a which are mounted on a support structure 49 attached to outer wall 12 of conveyor 10.

Disposed at 180° to bevel gear 40 and also in mesh with bevel gear 39 is a bevel gear 50. This gear 50 is mounted at one end of a shaft 51 for rotation therewith. The shaft 51 is supported by two journal bearings 52 and 52a which are suspended from the underside of bottom plate 14. At the outer end of the shaft 51 a crank 53 is secured. This crank 53 rotates with shaft 51 and drives a connecting rod 54 which is pivotally fastened by means of a pin 55 to a weight 56. The weight 56 is rigidly secured to a rod 57 passing through its center. The rod 57 is positioned for slidable movement in a pair of journal bearings 58 and 58a which are mounted on a support structure 59 attached to outer wall 12 of conveyor 10.

The driving mechanism on one side of the conveyor is identical to the driving mechanism on the other side as to size, weight, shape and position.

In operation the cranks 43 and 53 are driven in opposite directions as viewed in Fig. 1 due to the fact that their respective driving gears are substantially opposite each other while being driven by the same drive gear 39. However, the cranks 43 and 53, having the same length of arm and being rotated at the same speed, are so timed on their respective shafts that the weights 46 and 56 move in the same direction relative to the conveyor and the forces set up by the arms augment each other.

It is readily seen that the weights travel with a straight line reciprocating movement at a definite angle to the plane of the conveyor surface. Also, they travel with a speed characteristic of the simple harmonic movement of a slider-crank mechanism.

When the weight 46 and the rod 47 are moved back and forth between the bearings 48 and 48a, there will be set up forces transverse to the axis of the rod which will be periodically reversed in direction as the connecting rod swings from one side of the axis of the rod 47 to the other. The vertical and horizontal components of these forces, acting through the bearings 48 and 48a, will cause reaction forces to be set up in the container tending to oscillate the container about its vertical axis and to move the container up and down along the axis.

The helical conveying surface will be advanced forwardly and upwardly carrying the material placed thereon along with it, however, the direction of movement of the helical conveying surface is changed rather abruptly because of the harmonic movement of the conveying surface along a reciprocatory path and is therefore withdrawn from under the material allowing it to fall in a new relative position on the conveying surface. The relative movement between the conveying surface and the material not only assists in conveying the material, but the initial movement of the surface is sufficient to partially throw the material in the direction of travel.

In Figure 2 is illustrated a modification of the conveyor of my invention. In this form the conveyor 60 is identical as to construction and operation as the conveyor 10 of Figure 1. The method of drive is exactly the same as that shown in Figure 7 and described in connection with the conveyor of Figure 1.

However, in this modification the crank 43 drives a connecting rod 61 which in turn causes a swinging arm 62 to oscillate about a point on a support structure 63 on which it is pivotally mounted by a pin 64. This arm 62 passes through a cylindrical weight 65 which is adjustably positioned on the arm by a set screw 66. Thus the weight 65 is caused to oscillate in an arc of length A—A' about pin 64.

Also, crank 53 drives a connecting rod 71 which in turn causes a swinging arm 73 to oscillate about a point on a support structure 73 on which it is pivotally mounted by a pin 74. This arm 72 passes through a cylindrical weight 75 which is positioned on the arm by a set screw 76. Thus the weight 75 is caused to oscillate in an arc of length B—B' about pin 74.

The driving mechanism on one side of the conveyor is identical to the driving mechanism on the other side as to size, weight, shape and position and the two mechanisms are so timed that the forces set up by movement of the weights augment each other.

Figure 8:
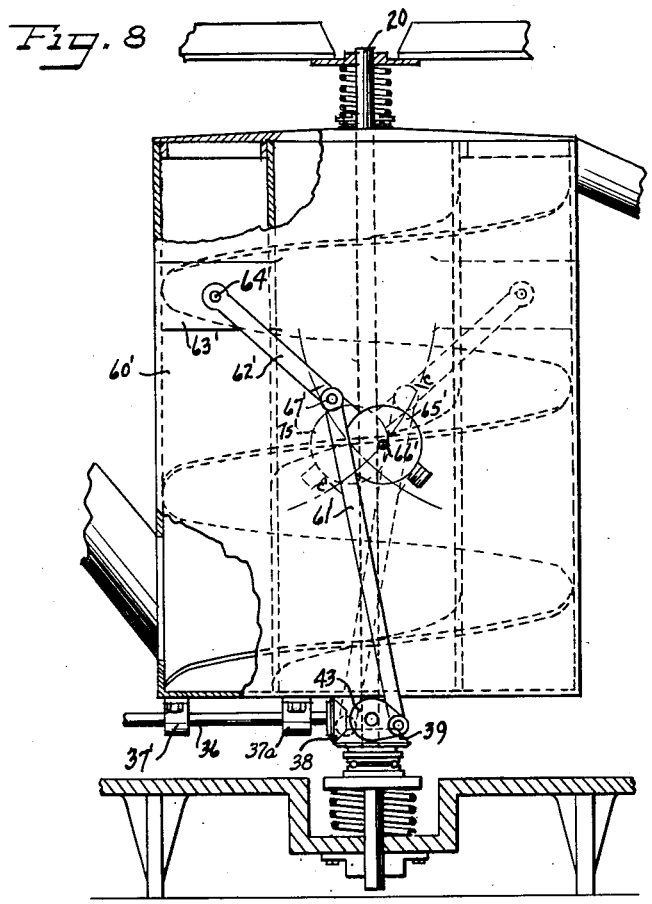
Figure 8 is a fragmentary side elevational view, partly in section and partly broken away, of a modified form of my invention.
Figure 9:
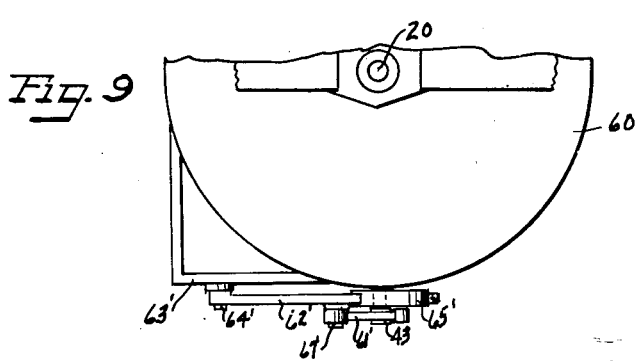
Figure 9 is a fragmentary plan view of the apparatus of Figure 8.

A variation of the modification of Figure 2 is illustrated in Figure 8. In this form the conveyor 60' is identical as to construction and operation to the conveyor 10 of Figure 1.

However, in this variation, the crank 43 drives a connecting rod 61' which is pivotally secured at 67' to an arm 62' mounted for oscillation about a point on a support structure 63' on which it is pivotally mounted by means of a pin 64'. The arm 62' passes through a weight member 65' which is adjustably positioned on the arm by a set screw 66'. Thus, the weight is caused to oscillate in an arc approximately of length C—C' about the pin 64'.

On the other side of the conveyor, the crank 53 causes the oscillation of a weight 75' through similar linkages, so that the forces set up by the oscillation of weights 65' and 75' augment each other.

This modification differs from that of Figure 2 in that the oscillating arms extend downwardly and, as a result, the arc of travel of the oscillating weights has a curvature opposite to that of arc A—A'.

In Figure 3 is illustrated an important modification of my invention. In this form of the invention the conveyor 80 is identical to the conveyor 10, as described in connection with Figure 1, in regard to construction, operation and mounting. However, instead of a mechanical driving means an electrical device is mounted on the conveyor wall.

This electrical device 81 is mounted on a pair of brackets 82 and 82a which project from the outer wall of the conveyor. This device is known as a vibrator and sets up a flow of powerful vibrations in the supporting structure by the action of pulsating waves of electric current on an electromagnet. A typical vibrator of this type is known to the trade as "Syntron." The direction of the vibrations set up by the vibrator may be adjusted by altering the inclination of the vibrator on the conveyor. In Figure 3 the electrical vibrator is positioned with its long axis at approximately 60° to the plane of the conveyor surface and therefore the conveyor will be vibrated back and forth in a straight-line movement at this angle. Any material on the conveyor surface will consequently be thrown upwardly and forwardly and thus will be moved upwardly along the inclined conveyor surface.

The advantages of this modification of my invention will be immediately apparent when it is noted that there are no mechanical parts that can wear or get out of adjustment. Also the installation is simple and the apparatus is positive in action. Since cheap electrical power is convenient in practically all localities, the economy of this installation is apparent.

I have heretofore described various modifications of my invention, but it will be understood that numerous other variations may be made in the character, construction and arrangement of the component parts and in the general assembly without departing from the principles and scope of the invention. To those skilled in the art many methods of producing motion of the conveyor in substantially a straight line will immediately present themselves.

I claim as my invention:

1. A feeder-type conveying apparatus comprising a member having a conveying surface, resilient mounting means for said member and an inertia system to cyclically move said member on said resilient mounting means comprising a mass, means connected directly with said mass for vibrating the same independently of movement of said member to produce harmonic motion of said mass along a predetermined reciprocatory path of traverse and connecting means between said mass and said member to impart the inertia forces developed by the harmonic motion of said mass to said member as a periodic disturbing force, whereby said member will be cyclically reciprocated in resonance with the motion of said mass.

2. A conveying apparatus as defined in claim 1 wherein said inertia system comprises a mass, a connecting rod pivotally connected thereto, and a crank pivotally connected to said rod, means to rotate said crank and said connecting means comprises a guideway affixed to said member and providing means to slidably support said mass for linear reciprocatory movement.

3. A conveying apparatus as defined in claim 2 wherein said member comprises a generally vertically disposed cylindrical container having a helical plate arranged therein and said guideway is carried by said member with the axis thereof angularly disposed away from the vertical axis of said container.

4. A conveying apparatus as defined in claim 1 wherein said inertia system comprises a lever arm, a mass connected adjacent one end of said lever arm, a connecting rod pivotally secured to said lever arm at a point intermediate the ends of said lever arm, a crank pivotally connected to said connecting rod, and means to rotate said crank and said connecting means comprises a pivotal connection between the other end of said lever arm and said member.

5. A conveying apparatus as defined in claim 4 wherein said member comprises a generally vertically disposed cylindrical container having a helical conveyor flight fixed therein, said lever arm being connected to said container and arranged together with said connecting rod to move said mass on a path of traverse generally transverse to the vertical axis of said container.

6. A conveying apparatus as defined in claim 1 wherein said inertia system comprises a mass comprising an armature, electromagnetic field means arranged adjacent said mass, means to alternately energize said field means to reciprocate said mass and said connecting means comprises a housing connected to said member and constructed to restrain movement of said mass on a linear reciprocatory path of predetermined length.

7. A conveying apparatus as defined in claim 6 wherein said connecting means includes adjustably positionable elements to fasten said housing to said member in selected angular positions.

8. A conveying apparatus as defined in claim 1 wherein said means to produce harmonic motion are arranged and disposed to align the predetermined reciprocatory path of traverse in the same general direction as the direction of movement of the conveyed material.

9. In an apparatus for conveying material upwardly, a support structure, a vertical shaft journaled for rotation in said structure, a helical conveying surface rigidly secured to said shaft for rotation therewith, sets of actuating means disposed on opposite sides of said conveying surface to move said conveying surface in a curvilinear reciprocating path, each set comprising a bracket mounted in firm assembly with said conveying surface, an oscillating arm pivotally secured to said bracket, a weight positioned on said oscillating arm, a connecting rod pivotally fastened to said oscillating arm, a crank arm pivotally secured to said connecting rod, and a pinion gear mounted for rotation with said crank arm and flexible driving means connected through gearing to each of said pinion gears, whereby said conveying surface will be cyclically moved in resonance with said actuating means.

10. In a conveyor, the combination of a conveying member having a helical conveying surface disposed about a generally vertical axis, resilient means supporting said member for axial reciprocation and rotational oscillation about such axis, a mass, means connected with said member guiding said mass for reciprocation along a path which has a vertical vector parallel to such axis and a horizontal vector which is tangent to a circle about such axis, and means connected directly with said mass for reciprocating the same along such path independently of movement of said member whereby the intertia forces developed by the reciprocation of said mass are imparted to said member as a periodic disturbing force to reciprocate said member along an inclined arcuate path.

11. The conveyor according to claim 10 further characterized in that a lever arm is provided to one end of which said mass is connected, and that said means connected with said member comprises a pivot to which the other end of said lever arm is pivotally connected.

12. The conveyor according to claim 10 characterized further in that said means connected with said member comprises a guide with which said mass has a sliding fit along such path.

13. In an apparatus for conveying material upwardly, a support structure, a vertical shaft journaled for rotation in said structure, a helical conveying surface rigidly secured to said shaft for rotation therewith, sets of actuating means disposed on opposite sides of said conveying surface to move said conveying surface in a curvilinear reciprocating path, each set comprising bearings mounted integral with said conveying surface, a weight mounted for sliding movement in said bearings, a connecting rod pivotally secured to said weight, a crank arm pivotally fastened to said connecting rod, and a pinion gear mounted for rotation with said crank arm and flexible driving means connected through a gearing to each of said pinion gears, whereby said conveying surface will be cyclically moved in resonance with said weights.

14. In an apparatus for conveying material upwardly, a support structure, a vertical shaft journaled for rotation in said structure, a helical conveying surface rigidly secured to said shaft for rotation therewith, sets of actuating means disposed on opposite sides of said conveying surface to move said conveying surface in a curvilinear reciprocating path, each set comprising bearings mounted integral with said conveying surface, a weight mounted for sliding movement in said bearings, a connecting rod pivotally secured to said weight, a crank arm pivotally fastened to said connecting rod, and a pinion gear mounted for rotation with said crank arm and motive means mounted in firm assembly with said conveying surface connected through a gearing to each of said pinion gears, whereby said conveying surface will be cyclically moved in resonance with said weights.

15. Apparatus according to claim 1 characterized further in that said means connected directly with said mass for vibrating the same includes a linkage inter-connecting said mass and member to maintain a predetermined amplitude of vibration of said mass relative to said member.

16. Apparatus according to claim 1 characterized further in that said means connected directly with said mass for vibrating the same includes a linkage inter-connecting said mass and member to maintain a predetermined amplitude of vibration of said mass relative to said member, and an eccentric drive for actuating said linkage.

17. Apparatus according to claim 16 characterized further in that said eccentric drive is supported on said member.

ROBERT M. CARRIER, JR.

REFERENCES CITED

The following references are of record in the file of this patent:

UNITED STATES PATENTS

| Number | Name | Date |
|---|---|---|
| 1,611,098 | Borner | Dec. 14, 1926 |
| 2,374,664 | Carrier | May 1, 1945 |
| 2,464,216 | Devol | Mar. 15, 1949 |
| 2,535,050 | Devol | Dec. 26, 1950 |

FOREIGN PATENTS

| Number | Country | Date |
|---|---|---|
| 279,119 | Great Britain | Oct. 15, 1927 |